United States Patent [19]
McGuffie

[11] Patent Number: 4,469,381
[45] Date of Patent: * Sep. 4, 1984

[54] THRUST AND RADIAL BALL BEARING

[75] Inventor: Michael J. McGuffie, Harwinton, Conn.

[73] Assignee: The Torrington Company, Torrington, Conn.

[*] Notice: The portion of the term of this patent subsequent to May 10, 2000 has been disclaimed.

[21] Appl. No.: 395,684

[22] Filed: Jul. 6, 1982

Related U.S. Application Data

[63] Continuation-in-part of Ser. No. 248,698, Mar. 30, 1981, Pat. No. 4,382,639.

[51] Int. Cl.³ .............................................. F16C 19/14
[52] U.S. Cl. .................................................... 308/174
[58] Field of Search ............... 308/174, 175, 176, 188, 308/189 R, 196, 207 R, 216, 232, 233, 235, DIG. 11; 384/425

[56] References Cited

U.S. PATENT DOCUMENTS

| 1,546,363 | 7/1925 | Beemer | 308/196 |
| 2,194,817 | 3/1940 | Biou | 308/193 |
| 3,070,412 | 12/1962 | Dorl | 308/174 |
| 3,653,732 | 4/1972 | Fairbank | 308/174 X |
| 4,099,761 | 7/1978 | Cullings | 384/425 X |
| 4,318,574 | 3/1982 | Nakamura | 308/216 |
| 4,382,639 | 5/1983 | McGuffie | 308/189 R |

Primary Examiner—Stuart S. Levy
Assistant Examiner—David Werner
Attorney, Agent, or Firm—F. S. Troidl

[57] ABSTRACT

The ball bearing comprises a pressed metal cup in which are loosely-mounted axially-spaced, pressed metal thrust washers which contact a plurality of balls. The thicknesses of the thrust washers and the diameter of the balls are chosen so that an axial clearance between the metal cup and a thrust washer is provided in response to an axial force.

2 Claims, 4 Drawing Figures

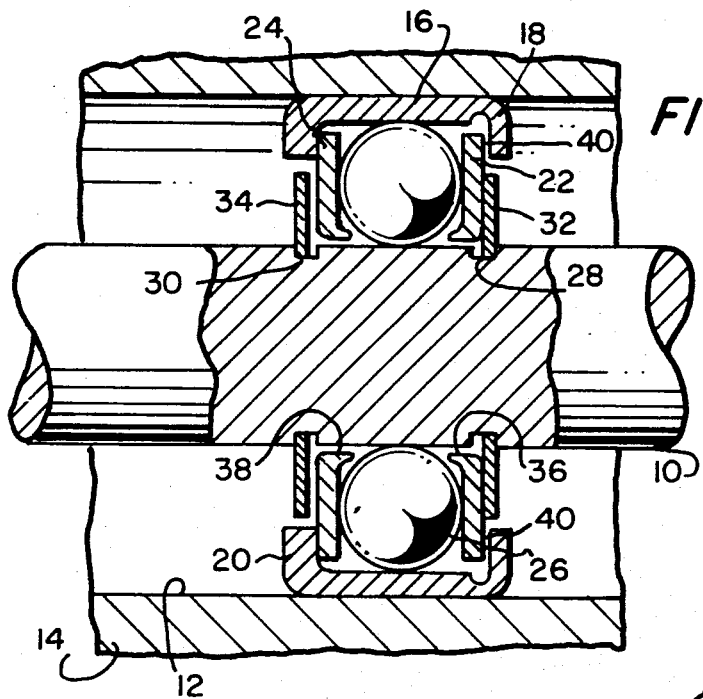
FIG. 1
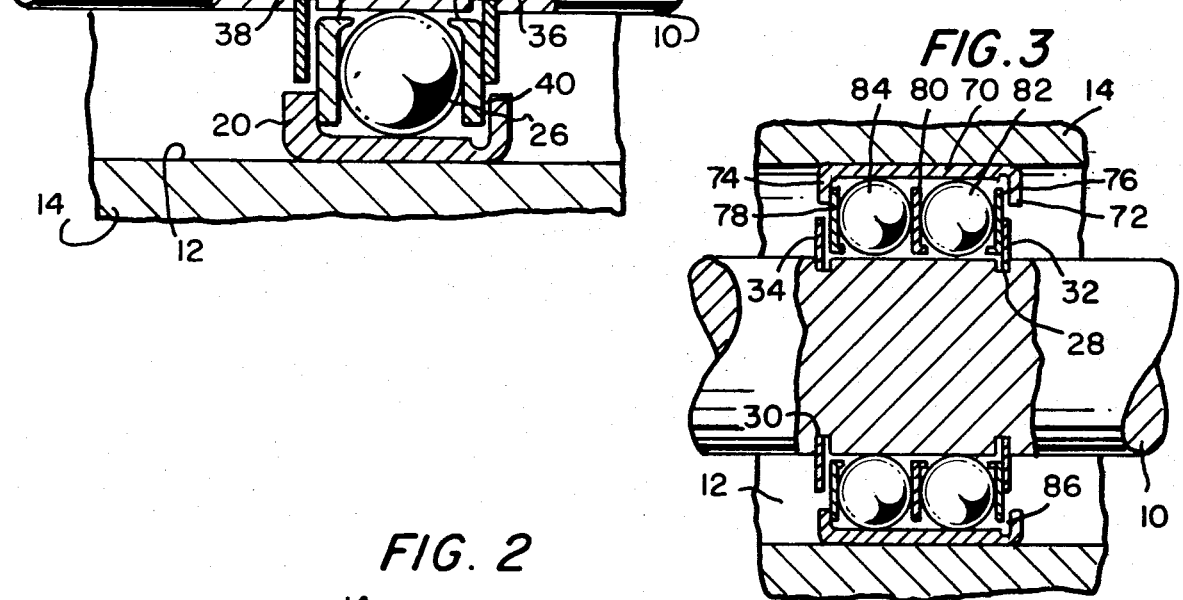
FIG. 3
FIG. 2
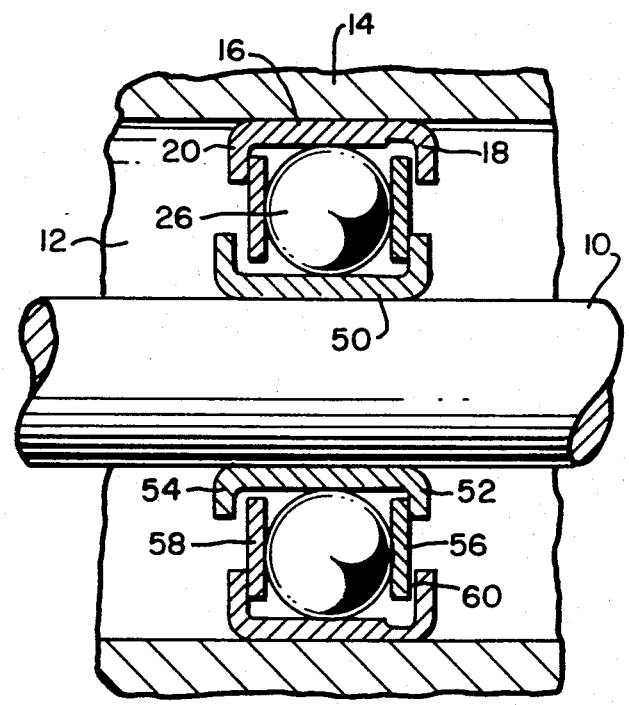
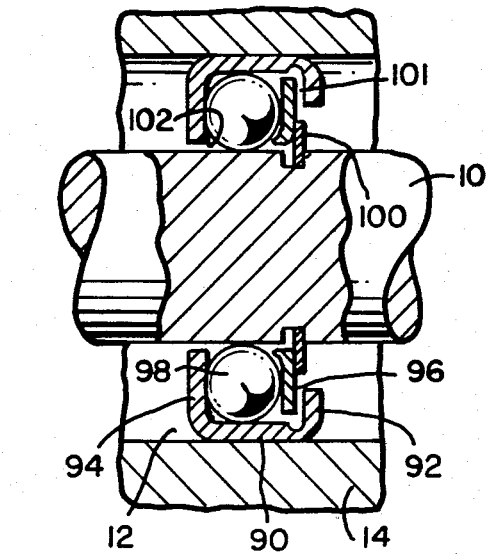
FIG. 4

THRUST AND RADIAL BALL BEARING

This is a continuation-in-part of my copending application, Ser. No. 248,698, filed Mar. 30, 1981, now U.S. Pat. No. 4,382,639, entitled "Bi-directional Thrust and Radial Ball Bearing."

This invention relates to bearings. More particularly, this invention is a new thrust and radial ball bearing.

For many applications, for example, to keep electric motors efficient, bearings must be used which are capable of accommodating both radial and axial loads. Often, the bearing must be capable of accommodating axial loads in one or both directions in addition to radial loads. The usual procedure for anti-frictionizing axial loads is to use relatively expensive machined race ball bearings with stepped housings and shafts.

With my new invention, a thrust and radial ball bearing is provided which is economical and can eliminate the need for housing and/or shaft steps. My new thrust and radial ball bearing includes a combination of pressed metal parts, balls, and press-fits to anti-frictionize axial thrust loads and radial loads at a significantly lower assembly cost than with current machined race ball bearings. This bearing also lends itself very well to greased-for-life applications because of its excellent grease capacity, and inherent shielding which keeps lubricants in and contaminants out.

Briefly described, this new thrust and radial ball bearing comprises a pressed metal cup with end flanges. At least one loosely-mounted, pressed metal annular thrust washer is retained in the metal cup by one of the end flanges. A plurality of balls are adapted to be contacted by the annular thrust washer. The diameter of each ball and the thicknesses of the thrust washer are such that a small axial clearnace exists between the end flange and the thrust washer when a force is exerted against the thrust washer in an axial direction.

The invention, as well as its many advantages, may be further understood by reference to the following detailed description and drawings in which:

FIG. 1 is a sectional, elevational view showing one preferred embodiment of the new bearing mounted about a shaft in a housing;

FIG. 2 is a sectional, elevational view showing a second preferred embodiment of the bearing mounted about a shaft within a housing;

FIG. 3 is a sectional, elevational view showing a third prferred embodiment of the bearing mounted about a shaft in a housing; and FIG. 4 is a sectional, elevational view showing a fourth preferred embodiment of the bearing mounted about a shaft in a housing.

In the various figures, like parts are referred to by like numbers.

Referring particularly to FIG. 1, the bi-directional thrust and radial ball bearing is mounted about a shaft 10 which extends through a bore 12 of housing 14. A pressed metal cup 16 having annular end flanges 18 and 20 is press-fit in the bore 12 of housing 14. The fit of the cup 16 is tight enough that once the cup is inserted in the bore 12, it will not be movable under normal operating conditions.

A pair of axially-spaced, pressed metal, annular thrust washers 22 and 24 are loosely mounted within the cup 16. Cup flanges 18 and 20, respectively, axially retain the annular pressed metal thrust washers 22 and 24, respectively, within the cup 16. A plurality of balls 26 are adapted to be contacted by the pressed metal thrust washers 22 and 24.

The rotatable shaft 10 is provided with axially-spaced, annular grooves 28 and 30 in which are placed snap rings 32 and 34, respectively. Oppositely-facing, inner-annular flanges 36 and 38 on pressed metal thrust washers 22 and 24, respectively, help keep the balls 26 in the proper radial position.

An important feature of the bi-directional thrust and radial ball bearing is that the thickness of the thrust washers 22 and 24 and the diameter of the balls 26 are such that an axial clearance 40 exists between the flange 18 and the thrust washer 22 when the thrust washer 24 is in contact with flange 20 and the balls 26 contact both the thrust washers 22 and 24. Thus, if an axial force is exerted toward the left, looking at FIG. 1, the pressed metal thrust washer 22 will be contacted by the snap ring 32 to press the balls 26 against the pressed metal thrust washer 24, which, in turn, is pressed against the flange 20. Because of clearance 40, the pressed metal thrust washer 22 will rotate with respect to the pressed metal thrust washer 24. The rotating shaft rotates the snap ring 32 at a fast rate, which in turn, rotates thrust washer 22. The cup 16 in housing 14 is fixed against rotation. Thus, while shaft 10 and thrust washer 22 rotate at a fast rate, under normal conditions, thrust washer 24 is kept still because it is pressed against the stationary cup 16.

If a force is exerted along the shaft 10 toward the right-hand direction, looking at FIG. 1, the snap ring 34 will engage pressed metal thrust washer 24 which will be pressed against the balls 26 and the balls will press the thrust washer 22 against the flange 18. This will create a clearance between flange 20 and thrust washer 24. In such case, the pressed metal thrust washer 24 will rotate while the pressed metal thrust washer 22 is still. Thus, this new bearing provides a fine, economical bearing which accommodates radial loads and also thrust loads in two directions.

In the embodiment of FIG. 2, instead of the snap rings, a pressed metal sleeve 50 having radially, outwardly extending end flanges 52 and 54 is press-fit on the shaft 10. The pressed metal annular thrust washers 57 and 58 are retained within the bearing by the end flanges 18 and 20 of cup 16 which is press-fit in the bore 12 of housing 14. The balls 26 are adapted to be engaged by the annular pressed metal thrust washers 56 and 58. The diameter of the balls 26 and the thicknesses of the thrust washers 56 and 58 are such that an axial clearance 60 will exist between the annular flange 18 and thrust washer 56 if a force is exerted along the shaft 10 which presses flange 52 on sleeve 50 against the thrust washer 56 which presses the balls 26 against thrust washer 58 which, in turn, is pressed against the annular flange 20 on cup 16. Thus, if shaft 10 rotates, the pressed metal thrust washer 56 will rotate.

If an axial force is exerted in the opposite direction, the sleeve 50 will be moved along with shaft 10 so that the flange 54 contacts thrust washer 58 which presses the balls 26 against thrust washer 56 which contacts annular flange 18. Thus, the thrust washer 58 will rotate. Thus, as with the embodiment of FIG. 1, the bearing accommodates thrust forces in two directions as well as radial forces.

In the embodiment of FIG. 3 the pressed metal cup 70 is provided with annular end flanges 72 and 74. End thrust washers 76 and 78 and a central thrust washer 80 are retained in the cup 70 by the cup flanges 72 and 74.

A first set of balls 82 are adapted to contact the central thrust washer 80 and end thrust washer 76. A second set of balls 84 are adapted to contact the central thrust washer 80 and end washer 78.

If a force is exerted toward the left, looking at FIG. 3, snap ring 32 engages end thrust washer 76 which in turn engages the set of balls 82 which engage the central thrust washer 80 which in turn engages the second set of balls 84. The balls 84 contact end thrust washer 78. The end thrust washer 78 is forced into tight contact with the annular end flange 74. A clearance 86, therefore, exists between end thrust washer 76 and end flange 72 on cup 70. The cup 70 is fixed against rotation and the end thrust washer 78 is pressed against the end flange 74 of the cup. Thus, as shaft 10 rotates the end thrust washer 76, balls 82, central thrust washer 80, and balls 84 rotate while end thrust washer 78 and the cup 70 remain fixed.

If a force is exerted by shaft 10 in the right hand direction looking at FIG. 3, snap ring 34 will contact end thrust washer 78. The thrust washer 78, balls 84, central thrust washer 80, balls 82, and end thrust washer 76 will all be pushed to the right so that a clearance will exist between end thrust washer 78 and end flange 74. End thrust washer 76 will be in firm contact with end flange 72. The end thrust washer 78, balls 84, central thrust washer 80, and balls 82 will all rotate with shaft 10 while end thrust washer 76 and the cup 70 remain fixed.

In the embodiment shown in FIG. 4 a thrust and radial ball bearing is shown which may be used when the thrust forces occur in only one axial direction. The pressed metal cup 90 is provided with end flanges 92 and end flange 94. A thrust washer 96 and balls 98 are retained in the metal cup 90 by end flanges 92 and 94, respectfully.

When a force is exerted against the thrust washer 96 by the snap ring 100 on shaft 10 in the proper axial direction, a clearance 101 exists between thrust washer 96 and end flange 92. The balls 98 contacted by thrust washer 96 are pressed against the end flange 94. The inside diameter of end flange 94 is less than the inside diameter of end flange 92 to provide an annular wall 102 around which the balls 98 rotate. Thus, the end washer 96 and balls 98 will rotate with the shaft 10 while the cup 90 will remain fixed.

I claim:

1. A thrust and radial ball bearing for use with rotatable shaft comprising: a pressed metal cup having end flanges; a single loosely-mounted annular thrust washer retained in the metal cup by one of said end flanges and adapted to fit loosely about the rotatable shaft so as to be axially movable with respect to the pressed metal cup; and a plurality of balls adapted to be contacted by the annular thrust washer, the diameter of each ball and the thickness of the thrust washer being such that an axial clearance exists between said one end flange and the thrust washer when a force exerted by the rotatable shaft in the proper axial direction is transmitted to the thrust washer to cause said thrust washer to engage the balls, and the balls to engage the other end flange of the cup.

2. A thrust and radial ball bearing comprising: a pressed metal cup having end flanges; a central thrust washer and two end thrust washers loosely retained in the metal cup by the cup flanges, and two sets of balls, each set of balls adapted to contact the central thrust washer and an end thrust washer, and an axial clearance exists between one cup end flange and one end thrust washer when a force is exerted against said one end thrust washer in the proper axial direction and said thrust washer engages one set of balls, said set of balls engages the central thrust washer, the central thrust washer engages the other set of balls, the other set of balls engages the other end thrust washer, and the other cup end flange is engaged by said other end thrust washer.

* * * * *